United States Patent [19]

Wakeman et al.

[11] Patent Number: 4,657,484
[45] Date of Patent: Apr. 14, 1987

[54] BLADE PITCH VARYING MEANS

[75] Inventors: Thomas G. Wakeman, Greendale, Ind.; Neil Walker, Cincinnati, Ohio

[73] Assignee: General Electric Company, Cincinnati, Ohio

[21] Appl. No.: 647,283

[22] Filed: Sep. 4, 1984

[51] Int. Cl.⁴ ............................................. B64C 11/48
[52] U.S. Cl. ................................... 416/127; 416/162; 416/166; 415/130
[58] Field of Search ............... 416/160, 165, 166, 127, 416/157 B, 162, 128–130; 415/130

[56] References Cited

U.S. PATENT DOCUMENTS

| 2,484,603 | 10/1949 | Audemar et al. | 416/157 R X |
| 2,486,016 | 10/1949 | Fairhurst | 416/127 |
| 3,549,272 | 12/1970 | Bauger et al. | 416/166 |
| 3,869,221 | 3/1975 | Wildner | 415/130 |
| 3,873,235 | 3/1975 | Mendelson | 416/154 |
| 3,873,236 | 3/1975 | Gall | 416/162 |
| 3,900,274 | 8/1975 | Johnston et al. | 416/160 X |
| 3,922,852 | 12/1975 | Drabek | 416/160 X |
| 3,924,404 | 12/1975 | Pollert | 416/130 X |
| 3,994,128 | 11/1976 | Griswold et al. | 416/165 X |
| 4,047,842 | 9/1977 | Avena et al. | 416/160 X |
| 4,061,440 | 12/1977 | Belliere | 416/157 R |

FOREIGN PATENT DOCUMENTS

| 178799 | 6/1954 | Austria | 416/127 |
| 896597 | 12/1953 | Fed. Rep. of Germany | 416/157 B |
| 233498 | 11/1944 | Switzerland | 416/157 B |
| 704809 | 3/1954 | United Kingdom | 416/157 B |
| 978916 | 1/1965 | United Kingdom | 415/130 |
| 731066 | 4/1980 | U.S.S.R. | 415/130 |

Primary Examiner—Everette A. Powell, Jr.
Attorney, Agent, or Firm—Douglas S. Foote; Derek P. Lawrence

[57] ABSTRACT

Blade pitch varying means for use in a gas turbine engine are disclosed. The blade pitch varying means may be used on an engine with a single row or two counter-rotating rows of variable pitch blades which are disposed outwardly from an annular gas flowpath and which are connected with a rotating airfoil within the flowpath. The blade pitch varying means comprise actuation means, bearing means, and gearing means. The actuation means are in a nonrotating reference frame disposed inwardly from the flowpath and deliver an axial force. The bearing means transmit the axial force from the nonrotating into a rotating reference frame which contains both the propulsor blade and the airfoil in the gas flowpath. The gearing means are located in the rotating reference frame and convert the axial force into a force for varying the blade pitch.

5 Claims, 1 Drawing Figure

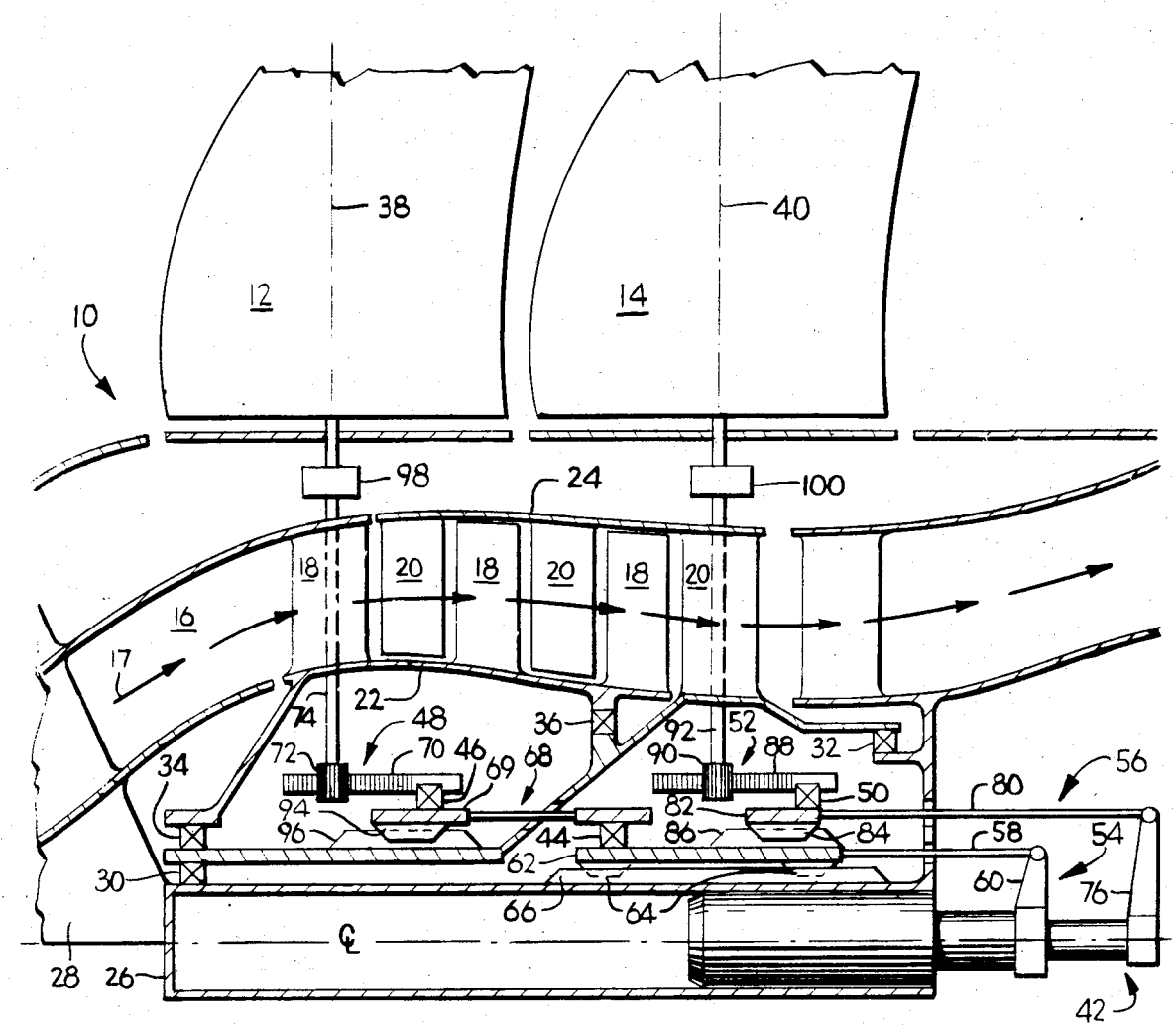

BLADE PITCH VARYING MEANS

This invention relates generally to pitch changing mechanisms for gas turbine engines and, more particularly, to pitch varying means for unducted fan blades.

BACKGROUND OF THE INVENTION

Gas turbine engines generally include a gas generator which comprises a compressor for compressing air flowing aft through the engine, a combustor in which fuel is mixed with the compressed air and ignited to form a high energy gas stream, and a turbine which includes a rotor for driving the compressor. Many engines further include a second turbine, known as a power turbine, located aft of the gas generator and which extracts energy from the gas flow to drive a rotating load with variable pitch blades such as found in the propulsor of helicopters, ducted turbofan engines, and turboprop engines.

A recent improvement over the turbofan and turboprop engines described above is the unducted fan engine such as disclosed in U.S. patent application Ser. No. 437,923 (abandoned). In the unducted fan engine, the power turbine includes counterrotating rotors and turbine blades which drive counterrotating unducted fan blades radially located with respect to the power turbine.

Conventional pitch changing mechanisms are generally unsuited to the unique mechanical arrangement of the unducted fan engine. More specific concerns include synchronizing the pitch change of each blade on a given blade row, reducing distortions in the event that a blade is lost, and providing balanced synchronization between blade rows.

OBJECTS OF THE INVENTION

It is an object of the present invention to provide new and improved blade pitch varying means for a gas turbine engine.

It is another object of the present invention to provide new and improved blade pitch varying means for a blade row which employs a single actuator.

It is a further object of the present invention to provide new and improved blade pitch varying means which transmit the actuation force through a gas flowpath.

It is yet another object of the present invention to provide new and improved blade pitch varying means for counterrotating unducted fan blades.

It is still a further object of the present invention to provide blade pitch varying means which are stable when confronted with unbalanced loads.

SUMMARY OF THE INVENTION

The present invention includes blade pitch varying means in a gas turbine engine. The engine includes a rotating, variable pitch blade, the blade being disposed outwardly from an annular gas flowpath and connected with a rotating airfoil within the flowpath. Both the blade and the airfoil are located within a common rotating reference frame. The blade pitch varying means comprise actuation means, bearing means, and gearing means. The actuation means are in a nonrotating reference frame disposed inwardly from the flowpath along the engine centerline and deliver an axial force. The bearing means transmit the axial force from the nonrotating reference frame into the rotating reference frame. The gearing means are in the rotating reference frame and convert the axial force into a force for varying the blade pitch.

BRIEF DESCRIPTION OF THE DRAWINGS

The FIGURE is a partial longitudinal sectional view which substantially illustrates a preferred embodiment to the present invention.

DETAILED DESCRIPTION OF THE DRAWINGS

The FIGURE illustrates a power turbine section 10 of a gas turbine engine. The gas turbine engine is of the unducted fan variety. Power turbine 10 includes an annular gas flowpath 16 for receiving combustion gases, shown by arrows 17. The gases in flowpath 16 turn first and second counterrotating blades 18 and 20, respectively. First turbine blades 18 are connected to first rotor 22 whereas second turbine blades 20 are connected to second turbine rotor 24.

According to the embodiment shown, a hollow static structure 26 connected to strut member 28 is located radially inward of rotors 22 and 24. Rotor 24 is supported on static structure 26 by bearings 30 and 32. Counterrotating rotor 22 is supported on rotor 24 by differential bearings 34 and 36.

According to one form of the present invention, it is desired to vary the pitch of forward propulsor blades 12 and aft propulsor blades 14. Each of forward propulsor blades 12 has a pitch change axis 38 and each of propulsor blades 14 has a pitch change axis 40. The pitch varying means of the present invention comprise actuation means 42 located within static structure 26, dual first bearing means 44 and 46 connected by linkage 68, first gearing means 48, second bearing means 50, and second gearing means 52. In addition, the pitch varying means may comprise first linkage means 54 for connecting actuation means 42 with bearing means 44 and 46, and second linkage means 56 for connecting actuation means 42 with second bearing means 50.

Actuation means 42 may comprise either tandem actuators or a single actuator with two stroking pistons located along the engine centerline. However, in either embodiment, actuation means 42 is effective for delivering a first and/or second axial force. The first axial force will be transmitted through first linkage means 54. For example, linkage means 54 may include a plurality of axially directed bar links 58 attached to a spider 60 which is connected to actuation means 42. Linkage means 54 also includes a first unison ring 62 which has a plurality of inwardly facing teeth 64. These teeth are adapted to slidingly engage a plurality of axially extending spines 66 located on static structure 26. In this manner, unison ring 62 provides stability to the axial motion imparted by actuation means 42, and the axial motion of unison ring 62 should be relatively unaffected by the loss of a propulsor blade. Furthermore, the location of the actuation means 42 along the engine centerline disposes the unison ring 62 symmetrically about the actuator means 42 and reduces distortion. In addition, any torque generated in the rotating members will be transmitted to static structure 26 through ring 62.

Bearing means 44 and 46 are connected by linkage 68 with ring 69. Ring 69 may include a plurality of inwardly facing teeth 94 adapted to slidingly engage a plurality of axially extending splines 96 on rotor 24.

The first axial force which translates unison ring 62 is transmitted into a frame of reference with second rotor 24 by bearing means 44. In this manner, linkage 68 will rotate with second rotor 24 while simultaneously axially translating with unison ring 62. Bearing means 46, which includes a differential bearing, will transmit the first axial force into a frame of reference with first rotor 22. Thus, the first axial force generated by actuation means 42 is transmitted into gearing means 48 in the manner described above.

First gearing means 48 includes a rack 70 and a pinion gear 72. Pinion gear 72 is connected to the radially inner end of a pitch change shaft 74. Each pitch change shaft 74 passes through a rotating strut or turbine blade 18. The axial motion of rack 70 is thereby converted into a force for varying the pitch of blades 12.

Various different structural arrangements are possible for transferring the rotation of blade shaft 74 into a rotation of each forward propulsor blade 12 about its axis 38. According to one form of the present invention, each blade 12 will be connected either directly or through gearing means 98 to a single pitch change shaft 74. According to another embodiment, two or more blades 12 may be joined to a single shaft 74 by a unison link (not shown).

The pitch of aft propulsor blades 14 may be varied in a similar manner. Second linkage means 56 which connects actuation means 42 with second bearing means 50 includes a spider 76, a bar link 80, and a second unison ring 82. Ring 82 includes a plurality of inwardly facing teeth 84 which are adapted to slidingly engage a plurality of outwardly facing and axially extending splines 86 on first unison ring 62. In this manner, second bearing means 50 are connected to second unison ring 82 and rotate with second rotor 24 thereby converting the second axial force transmitted through second linkage 56 into a frame of reference with second rotor 24.

Second gearing means 52 also rotates with second rotor 24. Gearing means 52 includes a rack 88 and a pinion gear 90. Pinion gear 90 is connected to the radially inner end of pitch change shaft 92. Each pitch change shaft 92 extends radially through one of the rotating struts or second blades 20 and may be connected either directly or through gearing means 100 with a blade 14. As with pitch change shaft 74, pitch change shaft 92 may vary the pitch of a single propulsor blade 14 or may be connected through a unison link to vary the pitch of two or more propulsor blades. In summary, as the second axial force translates second linkage means 56 and second gearing means 52, second gearing means 52 converts this force into a force for varying the blade pitch of each of the second propulsor blades 14.

In operation, the blade pitch of either or both of forward propulsor blades 12 and aft propulsor blades 14 may be varied by selectively generating first and/or second axial forces through actuation means 42. In the manner described above, a highly reliable and stable system for varying blade pitch may be achieved.

According to alternate forms of the present invention, a single actuator may be adapted to vary the blade pitch of two rows, or the blade pitch varying means may be adapted for varying the pitch of a single row of propulsor blades. As an example of the latter form, blade pitch varying means such as described above for changing the pitch of aft propulsor blades 14, shown in FIG. 1, may be employed. In such an embodiment, actuation means 42 require only a single stroke actuator. The propulsor pitch varying means also comprise bearing means for transmitting the axial force generated by the actuator into a frame of reference with the rotor, and gearing means rotating with the rotor for converting the axial force into a force for varying the propulsor blade pitch. Furthermore, the blade pitch varying means may comprise linkage means for connecting the actuation means with the bearing means. Such linkage means would include a unison ring with a plurality of inwardly facing teeth adapted to slidingly engage a plurality of radially extending splines, such as splines 86, which are coaxial with the static structure.

It will be clear to those skilled in the art that the present invention is not limited to the specific embodiments described and illustrated herein. Further, it applies equally to blade pitch varying means for both fan and propeller blades. In addition, the mechanical linkages shown and described herein are exemplary only and numerous alternative mechanical linkages are possible.

It will be understood that the dimensions and proportional and structural relationships shown in the drawing are by way of example only, and these illustrations are not to be taken as the actual dimensions or porportional structural relationships used in the blade pitch varying means of the present invention.

Numerous modifications, variations, and full and partial equivalents can be undertaken without departing from the invention as limited only by the spirit and scope of the appended claims.

What is desired to be secured by Letters Patent of the United States is the following.

What is claimed is:

1. In a gas turbine engine including an annular flowpath, a rotor with rotor blades extending into said flowpath, a hollow static structure inward of and coaxial with said flowpath for supporting said rotor, and a plurality of propulsor blades connected to said rotor blades radially outward of said flowpath, propulsor blade pitch varying means comprising:
   actuation means located within said static structure along the engine centerline for delivering an axial force;
   bearing means for transmitting said axial force into a frame of reference with said rotor;
   linkage means for connecting said actuation means with said bearing means, said linkage means including a unison ring with a plurality of inwardly facing teeth adapted to slidingly engage a plurality of axially extending splines coaxial with said static structure; and
   gearing means rotating with said rotor for converting said axial force into a force for varying the pitch of each of said propulsor blades.

2. In a gas turbine engine including first and second counterrotating turbine rotors and blades for driving first and second counterrotating propulsor blades, respectively, and a hollow static structure radially inward of said rotors, said second rotor being supported by bearings on said structure and said first rotor being supported on said second rotor by differential bearings, pitch varying means for varying the pitch of said first and second propulsor blades comprising:
   actuation means located within said sttic structure along the engine centerline for delivering a first and second axial force;
   dual first bearing means for first transmitting said first axial force into a frame of reference with said second rotor and then into a frame of reference with said first rotor;

first linkage means for connecting said actuation means with said first bearing means, wherein said first linkage means includes a first unison ring with a plurality of inwardly facing teeth adapted to slidingly engage a plurality of axially extending splines on said static structure;

first gearing means rotating with said first rotor for converting said first axial force into a force for varying the pitch of each of said first propulsor blades;

second bearing means for transmitting said second axial force into a frame of reference with said second rotor;

second linkage means for connecting said actuation means with said second bearing means, said second linkage means includes a second unison ring with a plurality of inwardly facing teeth adapted to slidingly engage a plurality of outwardly facing and axially extending splines on said first unison ring; and second gearing means rotating with said second rotor for converting said second axial force into a force for varying the pitch of each of said second propulsor blades.

3. Pitch varying means, as recited in claim 2, wherein each of said first propulsor blades includes a pitch change shaft which extends radially inwardly through one of said first turbine blades; and wherein said first gearing means includes a rack and a pinion gear connected to the radially inner end of said pitch change shaft.

4. Pitch varying means, as recited in claim 2, wherein each of said second propulsor blades includes a pitch change shaft which extends radially inwardly through one of said second turbine blades; and wherein said second gearing means includes a rack and a pinion gear connected to the radially inner end of said pitch change shaft.

5. Blade pitch varying means, as recited in claim 1, wherein said linkage means includes a plurality of axially directed bar links connected to said unison ring.

* * * * *